US012566728B2

(12) United States Patent
Stoute et al.

(10) Patent No.: US 12,566,728 B2
(45) Date of Patent: Mar. 3, 2026

(54) DATA REMEDIATION USING AN EVOLVING MODEL

(71) Applicant: Wells Fargo Bank, N.A., San Francisco, CA (US)

(72) Inventors: Michael Stoute, Gastonia, NC (US); Christopher Tate, Asheville, NC (US); Venkata Sudhakar Bulusu, Concord, NC (US); Robert Posert, Portland, OR (US); Carol Garcia, South Pasadena, CA (US); Stephen Karhnak, Matthews, NC (US); Siva Satram, Hyderabad (IN); Julian Stapleford, Glen Ridge, NJ (US); Doug G. Pewowaruk, Farmington, MN (US); Sitarama Raju Alluru, Woodbury, MN (US); Melissa Winnix, Middleburg, FL (US); Meghana Puligalla, Little Elm, TX (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/517,187

(22) Filed: Nov. 22, 2023

(65) Prior Publication Data

US 2025/0165433 A1 May 22, 2025

(51) Int. Cl.
*G06F 7/00* (2006.01)
*G06F 16/16* (2019.01)
(Continued)

(52) U.S. Cl.
CPC .......... *G06F 16/162* (2019.01); *G06F 18/241* (2023.01)

(58) Field of Classification Search
None
See application file for complete search history.

(56) References Cited

U.S. PATENT DOCUMENTS

| | | | |
|---|---|---|---|
| 6,920,450 | B2 | 7/2005 | Aono et al. |
| 7,398,261 | B2 | 7/2008 | Spivack et al. |

(Continued)

FOREIGN PATENT DOCUMENTS

| | | |
|---|---|---|
| CN | 107193988 A | 9/2017 |
| CN | 113158246 A | 7/2021 |

(Continued)

OTHER PUBLICATIONS

Babu et al., "Retrieval of Large Data From Medical Lake Repository-Heart Note", 2022 1st International Conference on Computational Science and Technology, IEEE, Nov. 9, 2022, pp. 518-522.

*Primary Examiner* — Tuan A Pham
(74) *Attorney, Agent, or Firm* — Shumaker & Sieffert, P.A.

(57) ABSTRACT

This disclosure describes techniques for performing data remediation. In one example, this disclosure describes a method that includes identifying a plurality of stale files; applying a classification model to each of the plurality of stale files; identifying a plurality of unclassified files, wherein each of the unclassified files is one of the plurality of stale files that the classification model was not able to classify with a confidence level that exceeds a threshold confidence level; updating the classification model, over a period of time, to generate an evolved classification model; applying the evolved classification model to each of the unclassified files; identifying a subset of the unclassified files that the evolved classification model was not able to classify with a confidence level that exceeds the threshold confidence level; and deleting each of the files in the subset of the unclassified files.

18 Claims, 5 Drawing Sheets

(51) Int. Cl.

*G06F 17/00* (2019.01)

*G06F 18/241* (2023.01)

(56) References Cited

U.S. PATENT DOCUMENTS

| | | | |
|---|---|---|---|
| 7,630,963 B2 | 12/2009 | Larimore et al. | |
| 8,666,991 B2 | 3/2014 | Peters et al. | |
| 9,292,507 B2 | 3/2016 | Calkowski et al. | |
| 9,311,481 B1 * | 4/2016 | Wawda | H04L 63/1416 |
| 9,558,218 B2 | 1/2017 | Dutta et al. | |
| 9,691,027 B1 * | 6/2017 | Sawant | G06F 21/6245 |
| 10,489,502 B2 | 11/2019 | Priestas et al. | |
| 10,579,281 B2 | 3/2020 | Cherubini et al. | |
| 11,019,088 B2 | 5/2021 | Pratt et al. | |
| 11,157,652 B2 | 10/2021 | Basava et al. | |
| 11,425,077 B2 | 8/2022 | Korotkikh | |
| 11,468,022 B2 | 10/2022 | Ramaswamy et al. | |
| 11,575,693 B1 | 2/2023 | Muddu et al. | |
| 2012/0110259 A1 | 5/2012 | Mills et al. | |
| 2013/0024637 A1 | 1/2013 | Hadley | |
| 2017/0357807 A1 * | 12/2017 | Harms | G06F 21/566 |
| 2020/0257697 A1 | 8/2020 | Bhabesh et al. | |
| 2020/0394396 A1 * | 12/2020 | Yanamandra | G06V 30/416 |
| 2021/0006472 A1 | 1/2021 | Khaspa et al. | |
| 2021/0256420 A1 * | 8/2021 | Elisha | G06N 20/00 |
| 2022/0004523 A1 | 1/2022 | He et al. | |
| 2022/0021652 A1 | 1/2022 | Moghe et al. | |
| 2022/0156489 A1 | 5/2022 | Agarwal et al. | |
| 2022/0245276 A1 * | 8/2022 | Gupta | G06F 21/6218 |

FOREIGN PATENT DOCUMENTS

| | | |
|---|---|---|
| CN | 113380414 A | 9/2021 |
| CN | 114490625 A | 5/2022 |
| CN | 114996254 A | 9/2022 |
| CN | 115129703 A | 9/2022 |
| CN | 115185742 A | 10/2022 |
| CN | 115203182 A | 10/2022 |
| DE | 202022103462 U1 | 6/2022 |
| KR | 20200084460 A | 7/2020 |

* cited by examiner

FIG. 1

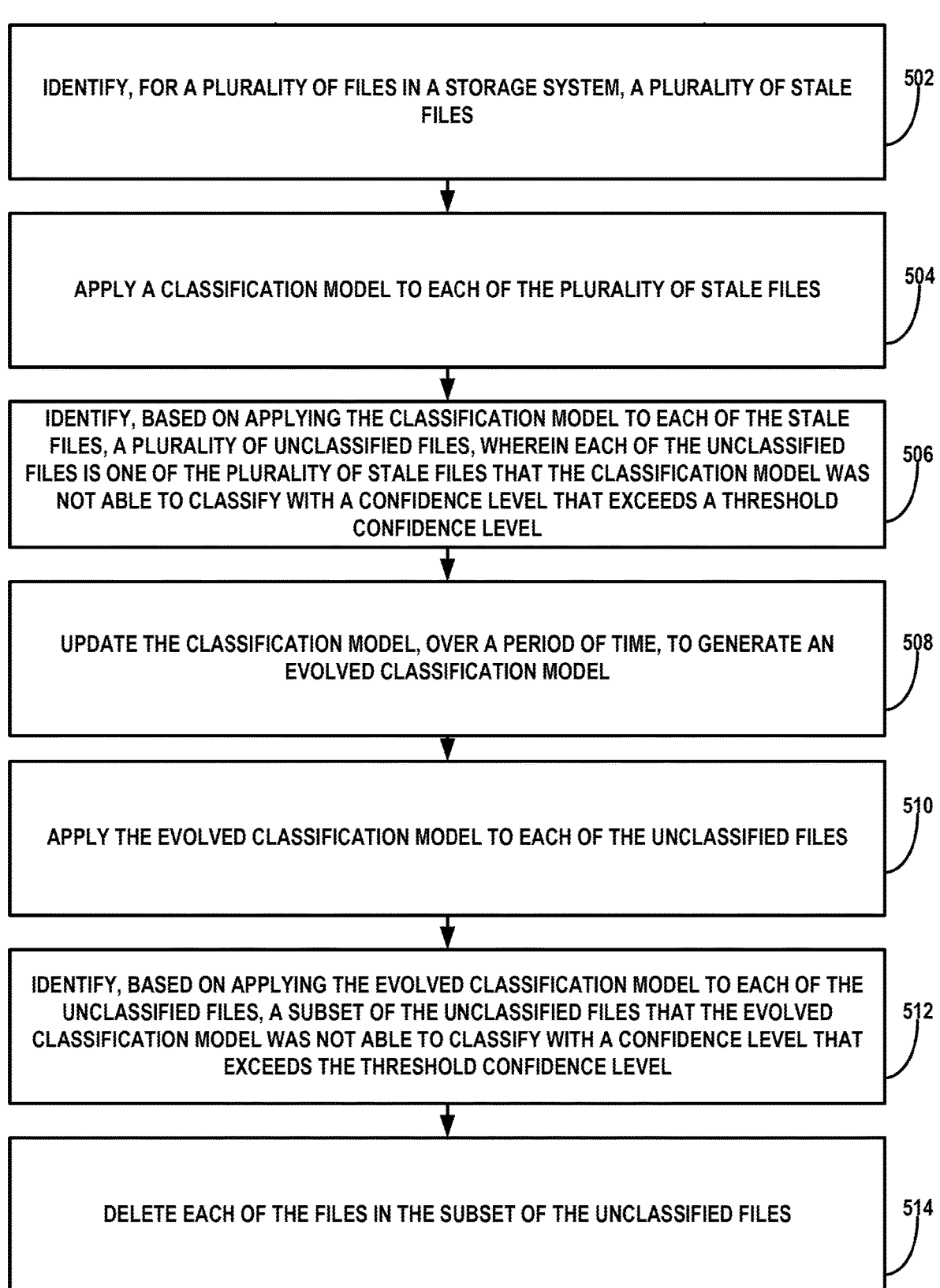

IDENTIFY, FOR A PLURALITY OF FILES IN A STORAGE SYSTEM, A PLURALITY OF STALE FILES — 502

APPLY A CLASSIFICATION MODEL TO EACH OF THE PLURALITY OF STALE FILES — 504

IDENTIFY, BASED ON APPLYING THE CLASSIFICATION MODEL TO EACH OF THE STALE FILES, A PLURALITY OF UNCLASSIFIED FILES, WHEREIN EACH OF THE UNCLASSIFIED FILES IS ONE OF THE PLURALITY OF STALE FILES THAT THE CLASSIFICATION MODEL WAS NOT ABLE TO CLASSIFY WITH A CONFIDENCE LEVEL THAT EXCEEDS A THRESHOLD CONFIDENCE LEVEL — 506

UPDATE THE CLASSIFICATION MODEL, OVER A PERIOD OF TIME, TO GENERATE AN EVOLVED CLASSIFICATION MODEL — 508

APPLY THE EVOLVED CLASSIFICATION MODEL TO EACH OF THE UNCLASSIFIED FILES — 510

IDENTIFY, BASED ON APPLYING THE EVOLVED CLASSIFICATION MODEL TO EACH OF THE UNCLASSIFIED FILES, A SUBSET OF THE UNCLASSIFIED FILES THAT THE EVOLVED CLASSIFICATION MODEL WAS NOT ABLE TO CLASSIFY WITH A CONFIDENCE LEVEL THAT EXCEEDS THE THRESHOLD CONFIDENCE LEVEL — 512

DELETE EACH OF THE FILES IN THE SUBSET OF THE UNCLASSIFIED FILES — 514

FIG. 5

DATA REMEDIATION USING AN EVOLVING MODEL

TECHNICAL FIELD

This disclosure relates to cloud computing systems, and more specifically, to techniques for remediating data in a storage system.

BACKGROUND

Data remediation is a process for maintaining the quality and reliability of an organization's data. In some cases, remediation involves identifying, cleaning, and correcting inaccurate, incomplete, or irrelevant data within a dataset. Data remediation can also involve removing data, typically by deleting files. Removing data helps organizations eliminate redundant, obsolete, and trivial (ROT) data, which can reduce storage costs and enhance workflow efficiency. By removing unnecessary files, organizations can streamline their data storage systems and improve overall data management.

Yet removing data involves risks. For example, removing data can impede later business operations. Removing data can also bring negative legal and/or regulatory implications.

SUMMARY

This disclosure outlines techniques for performing data remediation that involves classifying, categorizing, moving, archiving, and/or deleting data retained by an organization. In particular, techniques described herein involve use of an evolving model for classifying certain data, including stale and unstructured data that is stored within shared network drives, group shared drives, short-term data storage systems, or other storage systems. In some examples, a classification model that is retrained over a significant period of time makes repeated attempts to classify data. Data that the model is not able to classify with sufficient confidence may be placed in quarantine, for later reevaluation by a later version of the evolving model.

Over time, which may involve a period of years, the evolving model improves and becomes more skillful as a result of additional training, retraining, and/or refinement of the model based on training data that may be specific or unique to the organization. In some cases, the model may gain sufficient skill to be capable of classifying a significant amount, if not all, of an organization's data, including data previously placed in quarantine. Once classified, applicable data retention policies may be applied to the classified data, which may involve actions such as moving the data into a compliant content management repository, archiving the data in long-term storage, deletion, or other actions. Data that cannot be classified by the evolving model with sufficient accuracy or confidence, even after repeated attempts over a significant period of time, may, in at least some examples, be considered conclusively unrecognizable, and therefore appropriate for deletion.

In some examples, this disclosure describes operations performed by a computing system in accordance with one or more aspects of this disclosure. In one specific example, this disclosure describes a method comprising identifying, by a computing system and for a plurality of files in a storage system, a plurality of stale files; applying, by the computing system, a classification model to each of the plurality of stale files; identifying, by the computing system and based on applying the classification model to each of the stale files, a plurality of unclassified files, wherein each of the unclassified files is one of the plurality of stale files that the classification model was not able to classify with a confidence level that exceeds a threshold confidence level; updating the classification model, by the computing system and over a period of time, to generate an evolved classification model; applying, by the computing system, the evolved classification model to each of the unclassified files; identifying, by the computing system and based on applying the evolved classification model to each of the unclassified files, a subset of the unclassified files that the evolved classification model was not able to classify with a confidence level that exceeds the threshold confidence level; and deleting, by the computing system, each of the files in the subset of the unclassified files.

In another example, this disclosure describes a system comprising a storage system and processing circuitry having access to the storage system, wherein the processing circuitry is configured to carry out operations described herein. In yet another example, this disclosure describes a computer-readable storage medium comprising instructions that, when executed, configure processing circuitry of a computing system to carry out operations described herein.

BRIEF DESCRIPTION OF THE DRAWINGS

FIG. 1 is a conceptual diagram of an example system for performing data remediation using an evolving classification model, in accordance with one or more aspects of the present disclosure.

FIG. 5 is a flow diagram illustrating operations performed by an example remediation orchestrator in accordance with one or more aspects of the present disclosure.

DETAILED DESCRIPTION

Figure 1:
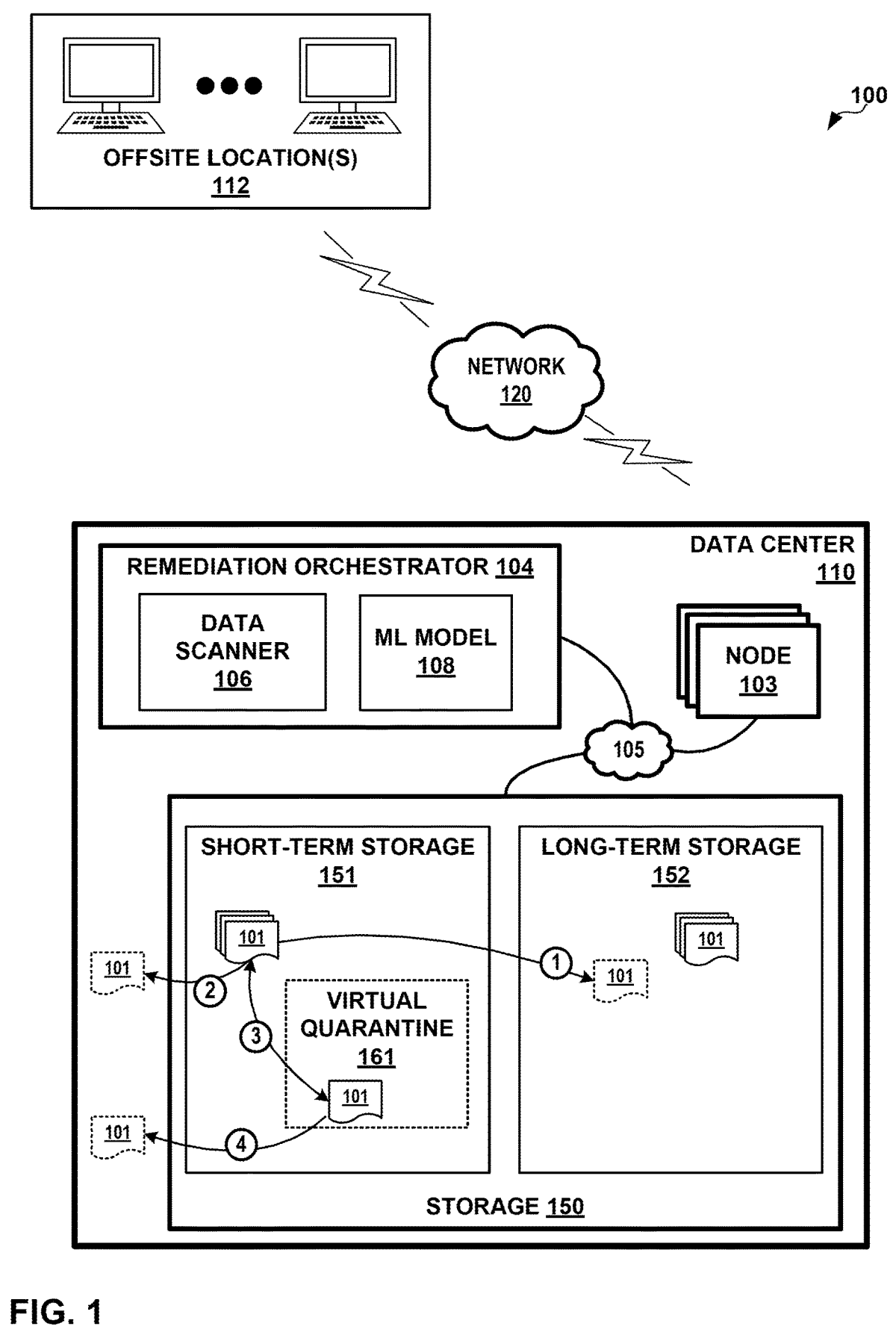
Figure 2:
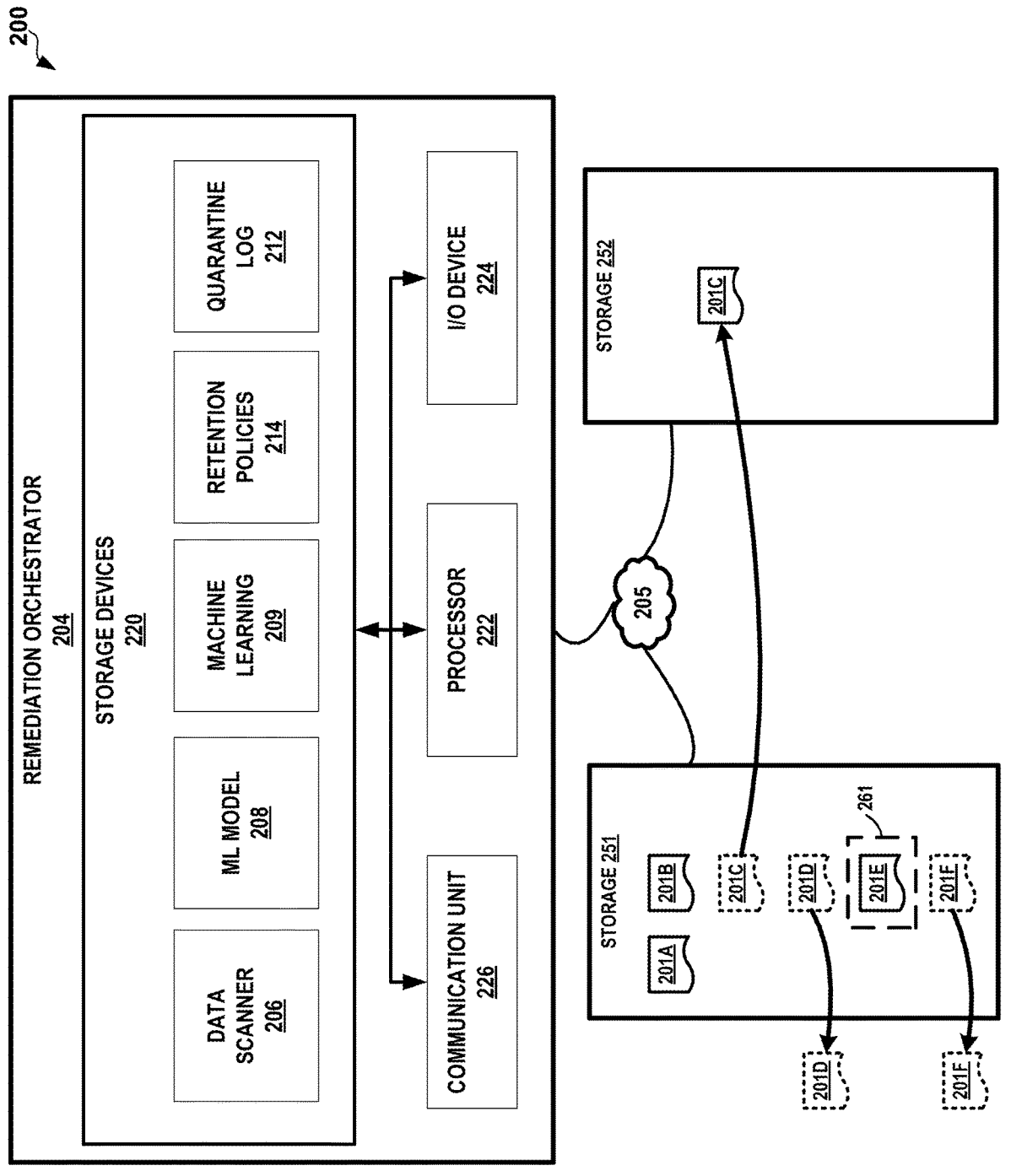
FIG. 2 is a block diagram illustrating an example system for performing data remediation using an evolving classification model, in accordance with one or more aspects of the present disclosure.

FIG. 1 is a conceptual diagram of an example system for performing data remediation using an evolving classification model, in accordance with one or more aspects of the present disclosure. As illustrated in FIG. 1, system 100 includes data center 110 connected to one or more offsite locations 112 over network 120. Although described as a "data center," data center 110 may be any appropriate collection of computing systems, whether in a form that might be typically referred to as a data center or otherwise. For example, data center 110 may represent one or more enterprise networks having various computing systems distributed across a physical location, such as an office or commercial building. Data center 110 may alternatively, or in addition, include various computing systems distributed across multiple geographic locations.

Offsite locations 112 may represent other physical locations having collections of computing devices capable of accessing data center 110 over network 120. In some examples, one or more of such offsite locations 112 may represent additional data centers 110. In other examples, one or more of such offsite locations 112 may include or represent branch offices, other enterprise networks, or locations from which client devices may access services provided by data center 110 over network 120.

Communications between data center 110 and offsite locations 112 may take place over network 120. Network 120 may be or may represent any appropriate communications infrastructure or platform through which offsite locations 112 may communicate with data center 110. Accordingly, network 120 may be or may include or represent any public or private communications network or other network, including the internet. In some examples, one or more offsite locations 112 could be directly connected to data center 110, potentially making network 120 unnecessary.

Data center 110 includes remediation orchestrator 104, compute nodes 103, and storage system 150, each capable of communicating with each other over network 105. Network 105 may represent a data center network fabric or other private network. In some examples, particularly where aspects of data center 110 span multiple locations, network 105, like network 120, may be or may include or represent any public or private communications network or other network, including the internet.

Storage system 150 (illustrated as "storage 150" in FIG. 1) may comprise a collection of storage devices, either physically or virtually present within data center 110. In some examples, storage system 150 may represent a collection of storage devices, drives, and/or storage systems, such as those maintained, used, or available to users of an enterprise network. Storage system 150 may also include various cloud-based storage systems capable of being accessed by data center 110 or systems within data center 110, but therefore potentially not physically present within data center 110.

Storage system 150 is illustrated in FIG. 1 as including short-term storage system 151 and long-term storage system 152, each of which may be implemented by a collection of storage devices, drives, or other types of storage systems. In one example, short-term storage system 151 may include shared storage devices ("group share" drives) such as those typically used and/or maintained an enterprise network for users of the enterprise network. Long-term storage system 152 may represent a content management repository for long-term storage of data, or any other appropriate storage repository. In some cases, long-term storage system 152 may be a regulatory or policy-compliant storage repository, capable of performing functions that may be mandated by regulatory or legal requirements, or that may be otherwise mandated by organizational policy. Both short-term storage system 151 and long-term storage system 152 store various files 101 having various forms. In general, each of files 101 is, as is conventional, a self-contained collection of information or data stored and structured pursuant to a file system recognized by at least some of the computing devices within data center 110.

Short-term storage system 151 may be used for relatively new files created, modified, or otherwise used by users of data center 110 when performing various tasks dictated by business operations. Short-term storage system 151 may represent storage that corresponds to group share drives accessible to users of an enterprise network. Files 101 stored in short-term storage system 151 could be either "structured" files or "unstructured" files. In some examples, a structured file may represent a file that is created, maintained, and/or used by one or more applications executing or capable of being executed within data center 110. An unstructured file may be a file not typically managed by an application executing within data center 110. Typical structured files may include data files used by a database or database service executing on one or more computing nodes within data center 110. Structured files could, alternatively or in addition, include many other types of files. Typical unstructured files may include word processing, spreadsheet, or similar files created by users. Unstructured files could, alternatively or in addition, include many other types of files.

Short-term storage system 151 includes quarantine 161, which, as described herein, may represent a physical or virtual storage space for certain files 101. In some examples, and as further described herein, files that have not been classified by classification model 108 with a sufficient level of confidence may be placed into quarantine 161. Such files may be removed from quarantine 161 once classified accurately. In some cases, such files may be removed from quarantine 161 after sufficient time has passed and sufficient unsuccessful attempts at classification have been made. In some examples, quarantine 161 maintains an index or record of files assigned to quarantine 161, where the files assigned to quarantine 161 are kept at their current location.

Long-term storage system 152 may be used for certain files 101 subject to regulatory, legal, or organizational policies. For example, certain regulatory, legal, and/or organizational policies might require files representing one category of data to be stored for five years, while also requiring files representing another category of data to be stored for ten years, as an example. Long-term storage system 152 may be configured or designed to be capable of keeping track of relevant attributes of each of the files 101 stored in long-term storage system 152 so that compliance with all regulatory, legal, and/or organizational policies is both possible and convenient. In some examples, long-term storage system 152 may maintain information about each of the files 101 stored within long-term storage system 152 using a database, a data store, metadata, log files, or otherwise. Such information about each of files 101 could include information about age, classification, whether each such file includes MNPI (material nonpublic information), CSI (Confidential Supervisory Information), PII (Personally Identifiable Information), ACP (Attorney Client Privilege) and other sensitive information.

Like long-term storage system 152, short-term storage system 151 may have some capabilities for complying with regulatory, legal, and/or organization policies as they relate to files 101. However, in general, use of long-term storage system 152 may be considered to be appropriate for making such compliance with policies more reliable, easier, and consistent than short-term storage system 151.

Although storage system 151 in FIG. 1 is labeled as "short-term" storage, storage system 151 may, in some examples, be used for storing data on a long-term basis. Similarly, although storage system 152 in FIG. 1 is labeled as "long-term" storage, storage system 152 may, in some examples, be used for storing data on a short-term basis. Accordingly, in at least some examples, certain data stored in short-term storage system 151 may be maintained and/or retained longer than certain other data stored in long-term storage system 152.

Compute nodes 103 illustrated in data center 110 may represent one or more virtual and/or physical compute devices or compute nodes capable of performing processing on behalf of users of data center 110. Such compute nodes 103 may execute various applications on behalf of such users and generate and/or consume data and/or files 101. Each of compute nodes 103 may be implemented through any suitable means, including through a physical device or computing system, a virtual machine, container, microservice, or otherwise.

Remediation orchestrator 104, also included in data center 110, includes data scanning module 106 and classification model 108. Remediation orchestrator 104 may cause 106 to engage in a cycle of repeated and/or periodic data scans and classification attempts. In each cycle, data scanning module 106 evaluates the content of each of file 101 and applies classification model 108 to each of files 101 in an attempt to classify such files 101. In some examples, classification model 108 may be a model trained through supervised machine learning techniques. Classification model 108 may be trained using to training data derived, at least in part, from human evaluators identifying an appropriate classification for each of a sample of files 101. Based on the training data, classification model 108 is trained to predict one or more appropriate classifications for a given file 101 based on the content of that file 101. Additional training examples are developed over time, and classification model 108 is retrained with the additional samples. As a result, classification model 108 may evolve over time based on the additional training and training data, and may become more skilled at classifying files 101. Accordingly, for some files 101, classification model 108 may be initially unable to classify a given file 101, but after classification model 108 has evolved and become more skillful, a later version of classification model 108 may be able to eventually classify that file 101 accurately and/or with high confidence.

Remediation orchestrator 104 may be implemented by any appropriate computing system, including by one or more compute nodes 103, or by one or more other server computers, workstations, mainframes, appliances, cloud computing systems, and/or other computing device that may be capable of performing operations and/or functions described in accordance with one or more aspects of the present disclosure. Remediation orchestrator 104 may represent a cloud computing system, server farm, and/or server cluster (or portion thereof) that provides services to client devices and other devices or systems. Although illustrated in FIG. 1 as a single system, remediation orchestrator 104 may be implemented by multiple devices or system, and may be implemented across multiple environments. For example, training and retraining of evolving classification model 108 is likely to be performed by a separate system than that executing a production version of classification model 108. Further, although illustrated in FIG. 1 as being located within or part of data center 110, remediation orchestrator 104 might be implemented outside of (or otherwise not part of) data center 110.

In operation, and in accordance with one or more aspects of the present disclosure, remediation orchestrator 104 may identify a subset of files 101 that are subject to data remediation. For instance, in an example that can be described in the context of FIG. 1, data scanning module 106 of remediation orchestrator 104 interacts with short-term storage system 151 over network 105 to identify each file 101 that represents unstructured data. For those files 101 that represent unstructured data, data scanning module 106 identifies which of those files 101 are considered "stale," which may correspond to files 101 that has not been modified in a significant period of time (e.g., three years). Data scanning module 106 identifies the files 101 that are both stale and represent unstructured data as the files subject to data remediation.

Remediation orchestrator 104 may identify files subject to data remediation that can be classified accurately. For instance, again referring to the example being described in the context of FIG. 1, data scanning module 106 of remediation orchestrator 104 applies classification model 108 to each of the files that are both stale and represent unstructured data (i.e., the files subject to data remediation). For each file 101, classification model 108 generates a predicted classification (or categorization) and a level of confidence associated with the prediction. Data scanning module 106 identifies a set of "classified" files that, based on the confidence levels associated with each predicted classification, classification model 108 was able to classify with sufficient confidence. Data scanning module 106 also identifies a set of "unclassified" files that, based on the confidence levels associated with the predicted classifications, classification model 108 was not able to classify with sufficient confidence. In some examples, a threshold confidence level may be used to determine whether a given file is considered classified or unclassified. For example, if a threshold of 80% is used, then those files 101 that classification model 108 was able to classify with at least 80% accuracy (e.g., 80%) are considered classified files. Those files 101 that classification model 108 was not able to classify with at least 80% accuracy are considered unclassified files.

Remediation orchestrator 104 may perform data remediation on the classified files. For instance, still with reference to FIG. 1, remediation orchestrator 104 determines that a first subset of the classified files (i.e., stale unstructured files 101 that have been classified with sufficient confidence) are, based on organizational policy and the predicted classification for each file in the subset, to be stored in a managed storage repository. Remediation orchestrator 104 moves the files 101 in this first subset to long-term storage system 152 (see arrow "1" in FIG. 1). Remediation orchestrator 104 determines that a second subset of the classified files are, based on organizational policy and the predicted classification for each file in this subset, considered safe for deletion. Remediation orchestrator 104 deletes these files in the second subset by removing them from storage system 150 (see arrow "2" in FIG. 1). In some examples, remediation orchestrator 104 may refrain from deleting or remediating files that are marked for exclusion. Remediation orchestrator 104 may, for files marked for exclusion, cause classification model 108 to scan the files and determine files classifications but refrain from performing other actions such as deletion on the files.

Remediation orchestrator 104 may perform data remediation on the unclassified files. For instance, continuing with the example being described in the context of FIG. 1, remediation orchestrator 104 places each of the unclassified files into quarantine 161 (see arrow "3" in FIG. 1). Quarantine 161 may be a virtual quarantine, so that placing a given file in quarantine may involve simply tagging the file or updating a log to indicate that the file is considered to be in quarantine. Where quarantine 161 is a virtual quarantine, each unclassified file may remain in place within short-term storage system 151. Files placed in quarantine 161 are held in place so that a later attempt at classification by classification model 108 can be performed. Such later attempts at classification may be performed pursuant to a schedule of periodic remediation scan and classification cycles that are performed by remediation orchestrator 104. Such scan and classification cycles can be performed over a significant period of time, such as on the order of three years, during which time classification model 108 may be retrained and updated based on new data. Accordingly, while unclassified files are held in quarantine 161, classification model 108 may evolve over time to become more skillful. Eventually, classification model 108 may become sufficiently skillful such that it is able to classify, with sufficient confidence, some or all of the files held in quarantine 161.

Accordingly in some cases, some of the unclassified files will have been previously placed in quarantine after a prior evaluation by data scanning module 106 and the evolving classification model 108. For those files that were already in quarantine, remediation orchestrator 104 may eventually be able to classify those files confidently and/or accurately. In that situation, remediation orchestrator 104 may remove the files from quarantine 161 (see two-sided arrow "3"), and apply appropriate remediation operations, such as moving files to long-term storage system 152 (arrow "1") or deletion (arrow "2").

However, for files that have been held in quarantine 161 for a long period of time and still cannot be classified with sufficient confidence, remediation orchestrator 104 may eventually determine that some of those files are simply not subject to accurate classification. For example, remediation orchestrator 104 may make this determination for files that have been in quarantine for a sufficient amount of time and that have been subject to a sufficient number of attempts to be characterized. In one example, remediation orchestrator 104 may characterize as unrecognizable a file that has not been able to be classified after six attempts at classification by classification model 108 over the course of three years. In some examples, remediation orchestrator 104 may choose to delete such unrecognizable files (see arrow "4" in FIG. 1).

Techniques described herein may provide certain technical advantages. For instance, by placing unclassified data into quarantine, rather than deleting or otherwise disposing of such data, remediation orchestrator 104 may avoid taking a remediation action for a file that may ultimately disrupt business operations, contravene a regulatory, legal, or organizational policy, or otherwise lead to negative effects. By evolving the classification model over time, at least some of the files placed in quarantine may eventually be properly and accurately classified, enabling responsible and lower-risk remediation operations to be applied to such files. In addition, remediation orchestrator 104 may be able to classify future stale files due more quickly to the improvement of the evolved classification model. Still further, as model 108 improves over time, continuing human efforts to review actions by model 108 and generate training samples for model 108 can be reduced or eliminated.

FIG. 2 is a block diagram illustrating an example system for performing data remediation using an evolving classification model, in accordance with one or more aspects of the present disclosure. System 200 of FIG. 2 includes remediation orchestrator 204, storage system 251, and storage system 252. Storage system 251 and storage system 252 may be examples of or alternative implementations of short-term storage system 151 and long-term storage system 152 of FIG. 1, respectively. FIG. 2 illustrates various files 201A through 201E (collectively, "files 201") within system 200. Some of files 201 may be stored within storage system 251, other files 201 may be stored within storage system 252. In some examples, certain files 201 that are stored within storage system 251 may be considered to be within quarantine 261. As with quarantine 161 of FIG. 1, quarantine 261 of FIG. 2 may be a physical location or virtual designation for files that have not been susceptible to classification. As described herein, files not stored within storage system 251 or storage system 252 may, in some examples, be considered deleted.

Remediation orchestrator 204 may operate to perform remediation tasks on one or more files 201 illustrated in FIG.

2. Remediation orchestrator 204 may be considered an example or alternative implementation of remediation orchestrator 104 of FIG. 1. Remediation orchestrator 204 is illustrated in FIG. 2 to facilitate a description of certain components, modules, and other aspects of a computing system that may implement data remediation, such as remediation orchestrator 104. Remediation orchestrator 204 is also illustrated in FIG. 2 to facilitate a description of how such a computing system may operate in accordance with techniques described herein.

In FIG. 2, remediation orchestrator 204 is shown with underlying physical hardware that includes one or more communication units 226, one or more processors 222, and one or more input/output devices 224, and one or more storage devices 220. Storage devices 220 may include data scanning module 206, classification model 208, quarantine log 212, retention policies 214, and machine learning module 209. One or more of the devices, modules, storage areas, or other components of remediation orchestrator 204 may be interconnected to enable inter-component communications (physically, communicatively, and/or operatively). In some examples, such connectivity may be provided by through communication channels, which may include a system bus, a network connection, an inter-process communication data structure, or any other method for communicating data. Although remediation orchestrator 204 of FIG. 2 may be considered an example implementation of remediation orchestrator 104, other implementations are possible.

For ease of illustration, remediation orchestrator 204 is depicted in FIG. 2 as a single computing system. However, in other examples, remediation orchestrator 204 may be implemented through multiple devices or computing systems distributed across a data center, multiple data centers, or multiple cloud networks. For example, separate computing systems may implement functionality described herein as being performed by each of various modules illustrated as being a part of remediation orchestrator 204 (e.g., data scanning module 206, classification model 208, machine learning module 209). Alternatively, or in addition, modules illustrated in FIG. 2 as included within remediation orchestrator 204 may be implemented through distributed virtualized compute instances (e.g., virtual machines, containers) of a data center, cloud computing system, server farm, and/or server cluster.

Data scanning module 206 may perform tasks relating to locating, identifying, and evaluating one or more files 201 stored across a collection of storage devices or storage systems. In some examples, data scanning module 206 may apply classification model 208 when attempting to classify one or more files 201. Classification model 208 may be an evolving machine learning model configured to predict an appropriate categorization or classification for one or more of files 201. In some examples, classification model 208 may make a categorization or classification prediction, and also identify the extent to which classification model 208 is confident or certain about its predictions. Classification model 208 may be created or updated by machine learning module 209 using supervised machine learning techniques.

Machine learning module 209 may cause classification model 208 to evolve based on additional training data that may become available over time. Such additional training data may be generated by machine learning module 209 based on presenting a subset of files 201 to a human evaluator, and based on the evaluations of such files 201, generating labeled training samples. In some cases, training samples may also be generated based on synthetic training examples specifically created for the purpose of training, retraining, and/or updating classification model 208.

Machine learning module 209 may select a subset of files 201 to present to a human evaluator. Machine learning module 209 may select a subset of files 201 processed by classification model 208 and generate a UI that includes visual elements indicating the files and associated classifications by classification model 208. For example, machine learning module 209 may generate a UI that includes one or more visual indicators of the subset of files 201 classified by classification model 208, one or more visual indicators indicating the classification for each file of the subset (e.g., a first file classified as junk, a second file classified as sensitive financial information, etc.), and one or more visual indicators associated with providing a user selection of whether the classification of the files was correct. Machine learning module 209 may cause I/O device 224 to output, for display, the UI that includes one or more visual indicators. Machine learning module 209 may generate the user interface to enable a human evaluator to provide feedback on the file classification performed by classification model 208.

Machine learning module 209 may update classification model 208 and cause classification model 208 to evolve based on human evaluation. Machine learning module 209, based on human evaluator feedback, may update classification model 208. For example, machine learning module 209 receives feedback from the human evaluator of confirming that a portion of the subset of the classifications by classification model 208 were correct, and that the remainder of the subset of the classifications were incorrect.

Retention policies 214 may serve as a repository for various policies pertaining to how files are to be created, modified, stored, deleted, retained, classified, categorized, or otherwise managed. Retention policies 214 may reflect regulatory, legal, and/or organizational policies.

Quarantine log 212 may serve as a repository for tagging, mapping, or otherwise identifying which of files 201 are considered to be within quarantine 261. Quarantine log 212 may also store information about attributes of such file 201, including information about classification attempts, prior predicted classifications, and confidence levels of such predicted classifications.

Modules illustrated in FIG. 2 (e.g., data scanning module 206, classification model 208, machine learning module 209) and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device.

Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated.

Further, each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

Figure 3:
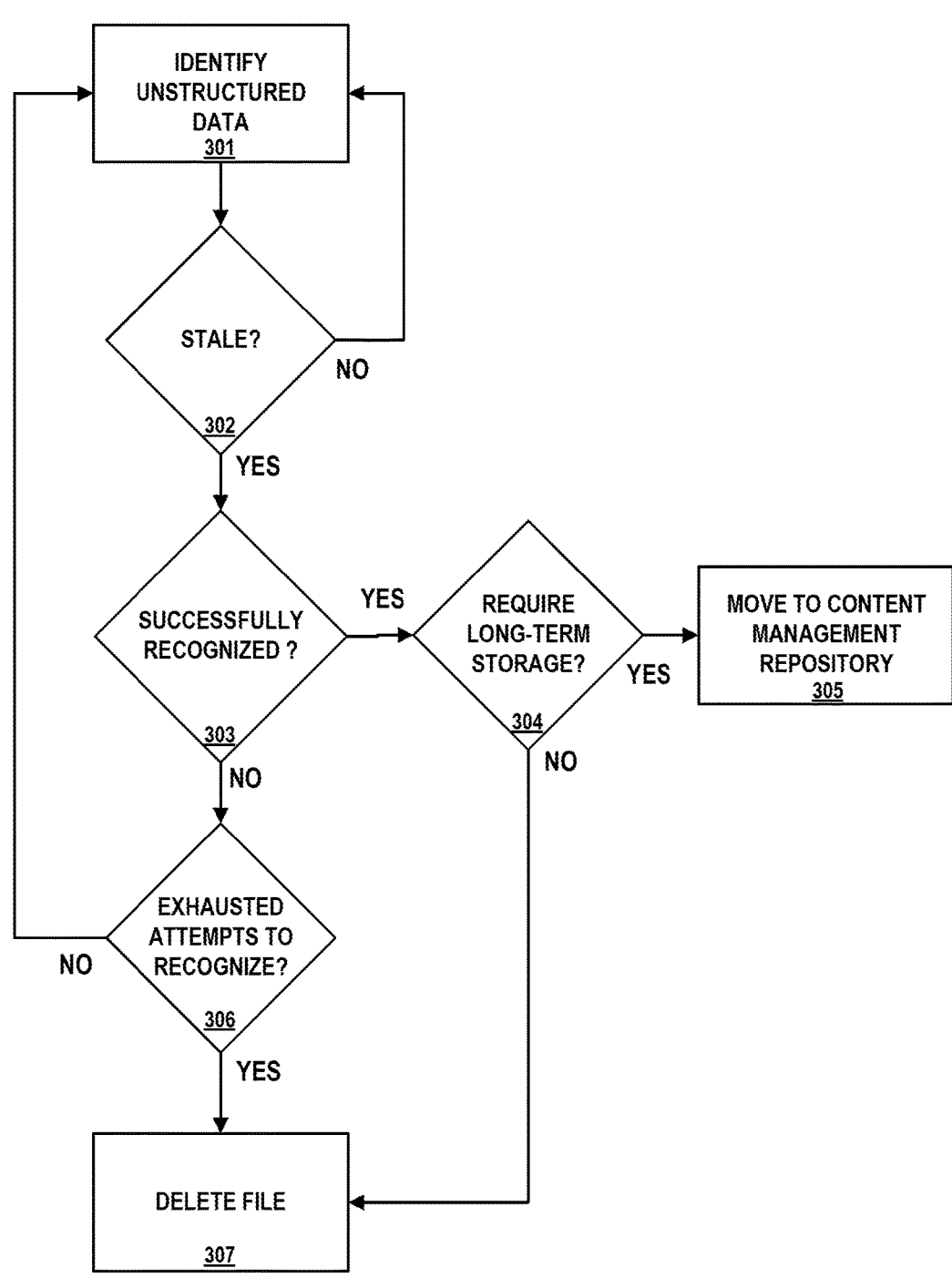
FIG. 3 is a flow diagram illustrating operations performed by an example remediation orchestrator, in accordance with one or more aspects of the present disclosure.

FIG. 3 is a flow diagram illustrating operations performed by an example remediation orchestrator 204 in accordance with one or more aspects of the present disclosure. FIG. 3 is described herein within the context of files 201 of FIG. 2. In other examples, operations described in FIG. 3 may be performed by one or more other components, modules, systems, or devices. Further, in other examples, operations described in connection with FIG. 3 may be merged, performed in a difference sequence, omitted, or may encompass additional operations not specifically illustrated or described.

In the process illustrated in FIG. 3, and in accordance with one or more aspects of the present disclosure, data scanning module 206 may identify unstructured data. For instance, in an example that can be described in the context of FIG. 2, data scanning module 206 of remediation orchestrator 204 outputs a signal over network 205. Storage system 251 responds with information about files 201 stored within storage system 251. Data scanning module 206 identifies which of files 201 can be characterized as unstructured data (301 in FIG. 3). In the example being described, data scanning module 206 determines that file 201A in FIG. 2 is "structured" data (i.e., file 201A is not unstructured data). Data scanning module 206 determines that files 201B through 201F are unstructured data.

Data scanning module 206 may ignore data that is not considered unstructured data. For instance, again with reference to FIG. 2, data scanning module 206 determines that file 201A does not qualify for data remediation, since based on retention policies 214, the data remediation process outlined in FIG. 3 applies only to unstructured data. Accordingly, in at least some examples, data scanning module 206 does not consider file 201A for data remediation, since file 201A is not of the type being targeted for remediation. In this example, data scanning module 206 does not move or otherwise modify how file 201A is stored, and file 201A remains stored "in place" in storage system 251 of FIG. 2. In other examples, data scanning module 206 may apply a data remediation process to structured data file 201A, which may be the same or different than that applied to unstructured data. In still other examples, a different system or module may apply a data remediation process to files of the type associated with file 201A. For example, some structured files 201 are directly managed by an application (e.g., a database system) that created, uses, or is otherwise associated with the structured file. For such files, data remediation may be performed by the application that uses the structured file.

Data scanning module 206 may apply data remediation to unstructured data that is considered stale and/or meets one or more criteria for remediation. For instance, again with reference to the example being described in the context of FIG. 2, data scanning module 206 evaluates each of the unstructured data files 201B through 201F. Data scanning module 206 identifies, for each of the unstructured files 201B through 201F, which of the files are considered stale (302). In some examples, a file may be considered stale if it has not been accessed (e.g., a "read" operation) for a threshold period of time. Alternatively, a file may be considered stale if it has not been modified (e.g., a "write" operation) for the same or a different threshold period of time (even if it has been accessed more recently). The specified threshold time periods can vary according to circumstances, but in one example, an appropriate threshold time period may be on the order of three years. In the example of FIG. 2, data scanning module 206 identifies files 201C through 201F as being stale, but data scanning module 206 determines that file 201B is not stale (e.g., it was recently accessed and/or modified). Accordingly, data scanning module 206 does not apply data remediation to file 201B, and in FIG. 2, file 201B remains, like file 201A, stored in place in storage system 251 (i.e., remediation orchestrator 204 does not move or otherwise modify how file 201B is stored). However, data scanning module 206 identifies files 201C through 201F as candidates for data remediation (YES path from 302).

Data scanning module 206 may apply a classification model to the stale and unstructured data. In some examples, data scanning module 206 may apply a classification model to files that are uncategorized regardless of whether the files are stale or if the files are active. For instance, again referring to FIG. 2, data scanning module 206 applies classification model 208 to each of files 201C through 201F (the files 201 identified as both unstructured data and stale). For each of these files, classification model 208 attempts to classify, categorize, or otherwise recognize the content of the file. For some of files 201C through 201F, classification model 208 might not be able to identify a classification. For others, classification model 208 may identify a predicted classification, and for each file that it can classify, classification model 208 generates a confidence indicator (e.g., 0% to 100% confidence).

Data scanning module 206 may process stale unstructured data that has been successfully recognized or classified. In some examples, data scanning module 206 may process files that are not stale but are uncategorized and once categorized, the classification model may be used to determine if a file is active or stale and subject to remediation. For instance, in the example of FIG. 2, classification model 208 is able to classify file 201C with 90% confidence, file 201D with 85% confidence, file 201E with 50% confidence, and file 201F with 10% confidence. In some situations, classification model 208 might not be able to classify some files 201 (such files may be considered classified with a confidence level of 0%). Data scanning module 206 may, based on one or more retention policies 214, use only those classifications determined by classification model 208 that have a sufficiently high confidence level (e.g., at or exceeding a threshold confidence level). In some examples, the threshold confidence level may be on the order of 80% or 85%, but higher or lower thresholds may be appropriate in other examples. Accordingly, data scanning module 206 may consider a file to be successfully recognized (YES path from 303) if classification model 208 is able to classify the file with a confidence level at or exceeding the threshold confidence level.

Data scanning module 206 may move recognized data to a content management repository. For instance, in the example being described in the context of FIG. 2, data scanning module 206 determines that classification model 208 was able to classify file 201C with a confidence level (90%) that exceeds a threshold confidence level (e.g., 80%). Data scanning module 206 further determines that the classification for file 201C indicates that file 201C is a file that should be kept in long-term storage, or that should otherwise be placed in a managed storage environment (e.g., an "official" record). Data scanning module 206 therefore moves file 201C to storage system 252, which may serve as a content management repository for files having the classification associated with file 201C (305 and YES path from 304).

Data scanning module 206 may delete other recognized data. For instance, again referring to the example being described in the context of FIG. 2, data scanning module 206 determines that classification model 208 was able to classify file 201D with a confidence level (85%) that exceeds the threshold confidence level (e.g., 80%). Data scanning module 206 further determines that the classification for file 201D indicates that file 201D is not a file that needs to be kept in long-term storage or in another type of managed storage. Data scanning module 206 therefore deletes file 201D, since it is unstructured data that is sufficiently stale, and based on the classification by classification model 208, it can be safely assumed to be not important enough to retain (307 and NO path from 304).

Data scanning module 206 may place unrecognized stale unstructured data in quarantine. For instance, again with reference to FIG. 2, data scanning module 206 determines that classification model 208 was able to classify file 201E, but (as described above) only with a confidence level of 50%. Data scanning module 206 determines that since the confidence level does not exceed the threshold confidence level (80%), classification model 208 was not able to successfully recognize file 201E (NO path from 303). Data scanning module 206 further determines that classification model 208 had not previously attempted to classify file 201E, so rather than deleting file 201E or placing file 201E into a different repository, data scanning module 206 elects to leave file 201E in place on storage system 251 (NO path from 306). In some examples, retaining file 201E in place on storage system 251 may be considered a type of virtual quarantine, enabling file 201E to continue being stored in storage system 251 until further evaluation at a later date. In such an example, data scanning module 206 updates quarantine log 212 to identify file 201E as being in quarantine, and to store information about the results of the attempt by classification model 208 to classify file 201E. Leaving file 201E in place has the advantage of making file 201E available for further use, access, or modification by client devices (i.e., operated by users) that may use data stored in storage system 251. If one of such client devices modifies file 201E, then that file 201E might no longer be considered stale, and thereby not subject to data remediation as outlined in the process of FIG. 3. In other examples, however, data scanning module 206 may move file 201E to another storage system (not shown in FIG. 2) that is designated for such quarantined files.

Data scanning module 206 may delete unrecognized stale data that has been held in quarantine for a sufficient time. For instance, again with reference to FIG. 2, data scanning module 206 determines that classification model 208 was able to classify file 201F, but (as described above) only with a confidence level of 10%. Data scanning module 206 determines that since the confidence level does not exceed the threshold confidence level (80%), classification model 208 was not able to successfully recognize file 201F. Data scanning module 206 accesses information about file 201F stored in quarantine log 212. Data scanning module 206 determines, based on the accessed information about file 201F, that six previous attempts to classify file 201F have been made over a period of three years. Based on this history of attempts to recognize file 201F and further based on retention policies 214, data scanning module 206 determines that it is appropriate to delete file 201F, even if it cannot be classified successfully, since repeated classification attempts over a long period of time might be, based on retention policies 214, considered sufficiently exhaustive efforts to classify file 201F (YES path from 306 and 307).

Data scanning module 206 may use a time and/or attempt threshold (e.g., as specified by retention policies 214) to determine when it is appropriate to delete a file 201 that has not been successfully classified. In some examples, retention policies 214 may specify that if a threshold number of attempts (e.g. six attempts) have been made to recognize a given unstructured and stale file 201, then it is appropriate to delete the file. Alternatively, or in addition, retention policies 214 may specify that it a threshold period of time has been passed and multiple attempts have been made to recognize a given unstructured and stale file 201, then it is appropriate to delete the file. In some examples, retention policy 214 may apply a six attempt over three year policy in this situation. In other words, retention policy 214 may specify that if six or more unsuccessful attempts have been made to recognize a given file 201, over a period of time spanning three or more years, then it is appropriate to delete the file. If less than six attempts have been made, or if less than three years have passed since the first attempt to recognize the file, then the file is to remain in quarantine.

Figure 4:
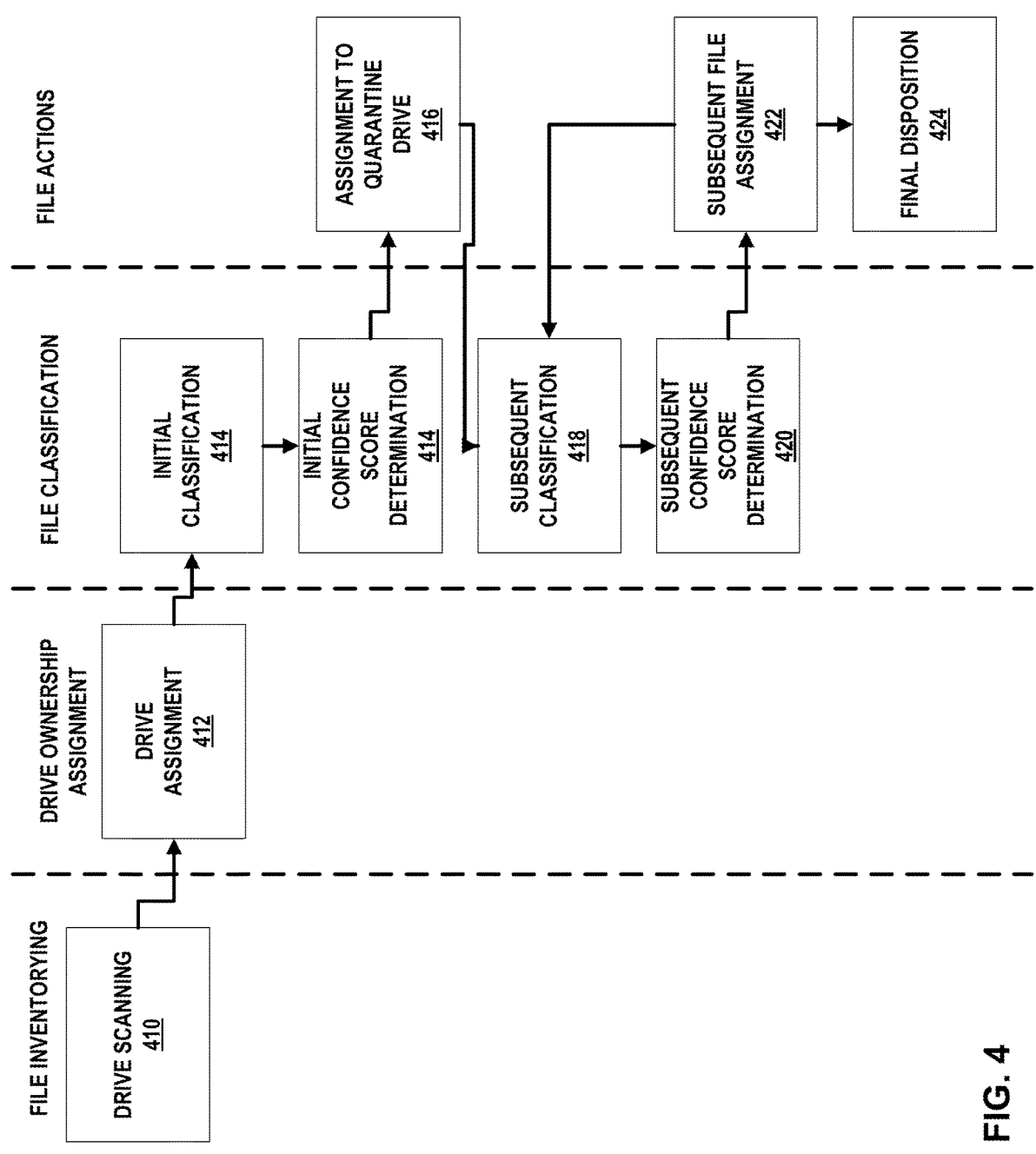
FIG. 4 is a flow diagram illustrating different types of operations performed by an example remediation orchestrator in accordance with one or more aspects of the present disclosure.

FIG. 4 is a flow diagram illustrating different types of operations performed by an example remediation orchestrator in accordance with one or more aspects of the present disclosure. For the purposes of clarity, FIG. 4 is described with respect to FIG. 2. The process of FIG. 4 is illustrated from four different perspectives: file inventorying operations performed by an example remediation orchestrator (leftmost column to the left of a dashed line), drive ownership assignment operations performed by an example remediation orchestrator (left-middle column between dashed lines), file classification operations performed by an example remediation orchestrator (right-middle column between dashed lines), and file actions performed by an example remediation orchestrator for (right-hand column to the right of a dashed line).

Remediation orchestrator 204 may perform an initial scan of one or more storage drives such as storages 251 and 252 in "DRIVE SCANNING 410." Remediation orchestrator 204 may perform a file inventory to identify stale files within storages 251 and 252. For example, remediation orchestrator 204 may scan storages 251 and 252 and other storage drives to identify stale files and associated shared drives. Remediation orchestrator 204 may scan shared drives that are subdivisions of storages 251 and 252. Storages 251 and 252 may include one or more subdivisions that are virtual drives shared among one or more users. Remediation orchestrator 204 may scan storages 251 and 252 to identify shared drives and user of each shared drive.

Remediation orchestrator 204 assigns owners to each shared drive of the shared drives in "DRIVE ASSIGNMENT 412". Based on user input (e.g., communications with users and/or interactions with a user interface), remediation orchestrator 204 may assign an owner to each separately definable storage space within storage 251, where that owner is responsible for managing the contents of the defined storage space. For example, remediation orchestrator 204 may assign an owner to a particular shared drive. Remediation orchestrator 204 may assign an owner to each of the shared drives to aid in managing and remediating the data within the shared drives. In addition, remediation orchestrator 204 may assign an owner to assist in granting access to storage cabinets that retain records that are retained. Further, remediation orchestrator 204 may use the assigned owner as a contact point for issues such as responding to high-risk content is discovered, if exceptions arise during remediation that require additional input, and/or granting access to managed storage or storage cabinets that may storage of files tagged by users as requiring long-term storage.

Remediation orchestrator 204 may perform a process of file classification. For example, remediation orchestrator 204 performs an initial classification of the unstructured and stale files within storages 251 and 252 in "INITIAL CLASSIFICATION 414" using classification model 208. Remediation orchestrator 204 may perform an initial classification of the unstructured and stale files to identify files that can confidently classified as eligible for deletion or as a file associated with classification requiring a particular retention schedule. Remediation orchestrator 204 may determine an initial confidence score when performing an initial classification of the unstructured and stale files in "INITIAL CONFIDENCE SCORE DETERMINATION 414". Remediation orchestrator 204 may determine a confidence score based on the output of classification model 208. For example, classification model 208 may provide an indication of the confidence of the classification following the classification. In one example, classification model 208 might determine that a classification of a particular file is 75% likely to be correct and output an indication of that confidence score to remediation orchestrator 204.

Remediation orchestrator 204, based on the initial classification and the initial confidence of the files, may quarantine one or more files ("ASSIGNMENT TO QUARANTINE DRIVE 416"). For example, remediation orchestrator 204 may, based on a low initial confidence score of a file classification for a particular file, tag or otherwise assign the file to quarantine 261. In an example, remediation orchestrator 204 may be configured to place in quarantine 261 files not meeting a threshold classification confidence rating, such as 80%. In one example, remediation orchestrator 204 receives an indication that a particular file has received a 60% confidence rating for an eligible-for-deletion file classification. Remediation orchestrator 204, based on the 60% confidence rating not meeting the 80% confidence threshold for deletion, assigns, transfers, tags, or otherwise places the particular file in quarantine 261.

Remediation orchestrator 204 may perform one or more subsequent classifications of the files in quarantine 261 in "SUBSEQUENT CLASSIFICATION 418". For example, remediation orchestrator 204 may perform classifications of the files of quarantine 261 periodically. For example, remediation orchestrator 204 may conduct classification using classification model 208 of the files every six months over a period of three years. Based on these subsequent classifications of the files in quarantine 261, remediation orchestrator 204 may receive information about confidence scores for files evaluated in these subsequent classifications by classification model 208. Remediation orchestrator 204 may receive indications of subsequent classification scores that differ from the initial classification score due to further training of classification model 208 and associated improvements of file classification performance by classification model 208. For example, remediation orchestrator 204 may receive an indication that classification model 208 has performed a subsequent classification with a confidence score that exceeds a confidence score threshold for a particular file, whereas an earlier version of the model 208 was unable to confidently classify that same file.

Remediation orchestrator 204 may perform subsequent file assignments based on classifications performed by classification model 208 in "SUBSEQUENT FILE ASSIGNMENT 422." For example, remediation orchestrator 204 may, based on a classification of a particular file by classification model 208 as being sensitive financial information with high confidence, assign a file deletion and retention schedule to the particular file. In another example, classification model 208 performs a subsequent file classification and provides an indication of a confidence score that is lower, and does not meet a confidence score threshold. In that situation, remediation orchestrator 204 may, based on the low confidence score, refrain from performing data remediation (e.g., performing a file deletion or drive assignment) and retain the file for one or more further rounds of model evolution and file classification by an updated classification model 208.

Remediation system 204 performs one or more final actions for the files analyzed by classification model 208 in "FINAL DISPOSITION 424 . . . . Remediation system 204 performs the final actions based on the file classifications and the confidence scores of the file classifications. For example, remediation system 204 may place a particular file in a long-term storage drive based on that file being assigned a classification having a mandated file retention schedule. In another example, remediation system 204 determines that, over a period of time, classification model 208 was unable to classify a particular file with a confidence score that exceeds a threshold confidence score. Remediation system 204, based on the determination, deletes the particular file.

FIG. 5 is a flow diagram illustrating operations performed by an example remediation orchestrator 204 in accordance with one or more aspects of the present disclosure. FIG. 5 is described below within the context of remediation orchestrator 204 of FIG. 2. In other examples, operations described in FIG. 5 may be performed by one or more other components, modules, systems, or devices. Further, in other examples, operations described in connection with FIG. 5 may be merged, performed in a difference sequence, omitted, or may encompass additional operations not specifically illustrated or described.

In the process illustrated in FIG. 5, and in accordance with one or more aspects of the present disclosure, remediation orchestrator 204 identifies, for a plurality of files in a storage system, such as storage system 251, a plurality of stale files (502). For example, data scanning module 206 as illustrated in FIG. 2 may scan storage 251 for files such as unstructured files. Data scanning module 206 may scan for files that are unstructured and not used or managed by one or more applications executing or capable of executing within a datacenter. Data scanning module 206 may identify files as stale based on one or more criteria such as whether a particular file has not been accessed or used for at least a predetermined period of time (e.g., three years).

Remediation orchestrator 204 applies a classification model, such as classification model 208, to each of the plurality of stale files (504). Classification model 208 may be trained to classify files into one or more categories of files such as MNPI (material nonpublic information), CSI (Confidential Supervisory Information), PII (Personally Identifiable Information), ACP (Attorney Client Privilege) and other sensitive information as well as into categories of non-sensitive information that does not need to be retained. Classification model 208 may be trained with an initial training set to bootstrap classification model 208 into an initial state for use in a first scan of the stale files. In some examples, an initial model may be based on scanning files 201 based on keywords that tend to identify appropriate classifications of files. In some examples, keywords can be used to generate an initial model (i.e., "model zero") before significant machine learning training processes are completed.

Remediation orchestrator 204 identifies, based on applying classification model 208 to each of the stale files, a plurality of unclassified files, wherein each of the unclassified files is one of the plurality of stale files that classification model 208 was not able to classify with a confidence level that exceeds a threshold confidence level (506). In an example, remediation orchestrator 204 identifies which files that classification model 208 was not able to classify with a confidence level of at least 90%. Remediation orchestrator 204 may use a threshold confidence level that is flexible and dependent upon the type of file classification. Remediation orchestrator 204, based on identifying the unclassified files, may assign the unclassified files to a quarantine drive such as quarantine 261. In some examples, remediation orchestrator 208 may add indicators of the unclassified files to the quarantine drive.

Remediation orchestrator 208 updates ML model 204, over a period of time, to generate an evolved classification model (508). For example, remediation orchestrator 204 may use machine learning module 209 to update classification model 208 to a more evolved or skilled classification model. Remediation orchestrator 208 may update classification model 208 over a period of time such as three years, potentially resulting in a sequence of more evolved models 208.

Remediation orchestrator 204 applies the evolved classification model to each of the unclassified files (510). Remediation orchestrator 204 may periodically apply updated versions of the evolved classification model to each of the unclassified files. For example, remediation orchestrator 204 may apply the evolved classification model to unclassified files every six months over a period of three years. Remediation orchestrator 204 may apply the evolved classification model to the unclassified files as the evolved classification is trained. In addition, remediation orchestrator 204 may apply the evolved classification to the files of quarantine 261.

Remediation orchestrator 204 identifies, based on applying the evolved classification model to each of the unclassified files, a subset of the unclassified files that the evolved classification model was not able to classify with a confidence level that exceeds the threshold confidence level (512). Remediation orchestrator 204 deletes each of the files in the subset of the unclassified files (514). For example, remediation orchestrator 204 may delete each of the files in the subset from quarantine 261. Remediation orchestrator 204 may delete each of the files and free up storage space within one or more storage drives.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The disclosures of all publications, patents, and patent applications referred to herein are hereby incorporated by reference. To the extent that any material that is incorporated by reference conflicts with the present disclosure, the present disclosure shall control.

For ease of illustration, only a limited number of devices (e.g., compute nodes 103, remediation orchestrator 104, remediation orchestrator 204, as well as others) are shown within the Figures and/or in other illustrations referenced herein. However, techniques in accordance with one or more aspects of the present disclosure may be performed with many more of such systems, components, devices, modules, and/or other items, and collective references to such systems, components, devices, modules, and/or other items may represent any number of such systems, components, devices, modules, and/or other items.

The Figures included herein each illustrate at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the Figures and/or may include additional devices and/or components not shown in the Figures.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific Figures, such systems, devices, and/or components may be implemented in a number of different ways. For instance, one or more devices illustrated herein as separate devices may alternatively be implemented as a single device; one or more components illustrated as separate components may alternatively be implemented as a single component. Also, in some examples, one or more devices illustrated in the Figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Also, one or more devices or components that may be illustrated in various Figures herein may alternatively be implemented as part of another device or component not shown in such Figures. In this and other ways, some of the functions described herein may be performed via distributed processing by two or more devices or components.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

Although specific advantages have been identified in connection with descriptions of some examples, various other examples may include some, none, or all of the enumerated advantages. Other advantages, technical or otherwise, may become apparent to one of ordinary skill in the art from the present disclosure. Further, although specific examples have been disclosed herein, aspects of this disclosure may be implemented using any number of techniques, whether currently known or not, and accordingly, the present disclosure is not limited to the examples specifically described and/or illustrated in this disclosure.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, or optical disk storage, magnetic disk storage, or other magnetic storage devices, flash memory, or any other medium that can be used to store desired program code in the form of instructions or data structures and that can be accessed by a computer. Also, any connection may properly be termed a computer-readable medium. For example, if instructions are transmitted from a website, server, or other remote source using a wired (e.g., coaxial cable, fiber optic cable, twisted pair) or wireless (e.g., infrared, radio, and microwave) connection, then the wired or wireless connection is included in the definition of medium. It should be understood, however, that computer-readable storage media and data storage media do not include connections, carrier waves, signals, or other transient media, but are instead directed to non-transient, tangible storage media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including, to the extent appropriate, a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A method, comprising:
identifying, by a computing system and for a plurality of files in a storage system, a plurality of stale files;
applying, by the computing system, a classification model to each of the plurality of stale files;
identifying, by the computing system and based on applying the classification model to each of the stale files, a plurality of unclassified files, wherein each of the unclassified files is one of the plurality of stale files that the classification model was not able to classify with an associated confidence level that exceeds a threshold confidence level, wherein the confidence level indicates accuracy of classification;
updating the classification model, by the computing system and over a period of time, to generate an evolved classification model, wherein the evolved classification model is trained using training samples developed over time to improve the evolved classification model;
applying, by the computing system, the evolved classification model to each of the unclassified files;
identifying, by the computing system and based on applying the evolved classification model to each of the unclassified files, a subset of the unclassified files that the evolved classification model was not able to classify with a confidence level that exceeds the threshold confidence level;
identifying, by the computing system and based on applying the classification model to each of the stale files, a plurality of classified files;
moving, by the computing system, a first subset of the plurality of classified files to a content management repository, wherein moving the first subset includes identifying each of the stale files in the first subset as an official record;
deleting, by the computing system, a second subset of the plurality of classified files, wherein deleting the second subset includes identifying each of the stale files in the second subset as not an official record; and deleting, by the computing system, each of the files in the subset of the unclassified files.

2. The method of claim 1, wherein identifying the plurality of stale files includes:
identifying a plurality of files that have not been modified during a threshold period of time.

3. The method of claim 1, wherein identifying the plurality of stale files includes:
identifying a plurality of files that have not been accessed during a threshold period of time.

4. The method of claim 1, wherein identifying the plurality of stale files includes:
identifying a plurality of stale files that each represent unstructured data.

5. The method of claim 1,
wherein each of the classified files of the plurality of classified files is one of the plurality of stale files that the classification model was able to classify with a confidence level that exceeds the threshold confidence level.

6. The method of claim 1, wherein identifying the subset of the unclassified files includes:
identifying a subset of the unclassified files that are stale when applying the evolved classification model to the unclassified files.

7. The method of claim 1, wherein the subset of the unclassified files is a first subset of the unclassified files, and wherein the method further comprises:
identifying, by the computing system and based on applying the evolved classification model to the unclassified files, a second subset of the unclassified files that the evolved classification model was able to classify with a confidence level that exceeds the threshold confidence level.

8. The method of claim 7, wherein identifying the second subset of the unclassified files includes:
identifying a first file in the second subset as an official document; and
identifying a second file in the second subset as not an official document.

9. The method of claim 8, further comprising:
moving, by the computing system, the first file to a content management repository; and
deleting, by the computing system, the second file.

10. The method of claim 8, wherein identifying the second subset of the unclassified files further includes:
identifying a second subset of the unclassified files as files that are stale when applying the evolved classification model to the unclassified files.

11. The method of claim 1, wherein updating the classification model to generate the evolved classification model includes:
updating the classification model over an approximately three year period of time.

12. The method of claim 1, wherein updating the classification model to generate the evolved classification model includes:
repeatedly updating the classification model over the period of time to generate a sequence of updated classification models.

13. The method of claim 12, wherein repeatedly updating the classification model over the period of time includes:
repeatedly updating the classification model at least six times over an at least three-year period of time.

14. The method of claim 12, wherein identifying the subset of the unclassified files includes:

identifying a subset of the unclassified files that none of the updated classification models in the sequence of updated classification models was able to classify with a confidence level that exceeds the threshold confidence level.

15. A computing system comprising:

a storage device; and processing circuitry, wherein the processing circuitry has access to the storage device and is configured to:

identify, for a plurality of files in a storage system, a plurality of stale files;

apply a classification model to each of the plurality of stale files;

identify, based on applying the classification model to each of the stale files, a plurality of unclassified files, wherein each of the unclassified files is one of the plurality of stale files that the classification model was not able to classify with an associated confidence level that exceeds a threshold confidence level, wherein the confidence level indicates accuracy of classification;

update the classification model over a period of time to generate an evolved classification model, wherein the evolved classification model is trained using training samples developed over time to improve the evolved classification model;

apply the evolved classification model to each of the unclassified files;

identify, based on applying the evolved classification model to each of the unclassified files, a subset of the unclassified files that the evolved classification model was not able to classify with a confidence level that exceeds the threshold confidence level;

identify, based on applying the classification model to each of the stale files, a plurality of classified files;

move a first subset of the plurality of classified files to a content management repository, wherein to move the first subset, the processing circuitry is further configured to identify each of the stale files in the first subset as an official record;

delete a second subset of the plurality of classified files, wherein to delete the second subset, the processing circuitry is further configured to identify each of the stale files in the second subset as not an official record; and delete each of the files in the subset of the unclassified files.

16. The computing system of claim 15, wherein each of the classified files of the plurality of classified files is one of the plurality of stale files that the classification model was able to classify with a confidence level that exceeds the threshold confidence level.

17. The computing system of claim 15, wherein to identify the subset of the unclassified files, the processing circuitry is further configured to:

identify a subset of the unclassified files as files that are stale when applying the evolved classification model to the unclassified files.

18. A non-transitory computer-readable medium comprising instructions that, when executed, configure processing circuitry of a computing system to:

identify, for a plurality of files in a storage system, a plurality of stale files;

apply a classification model to each of the plurality of stale files;

identify, based on applying the classification model to each of the stale files, a plurality of unclassified files, wherein each of the unclassified files is one of the plurality of stale files that the classification model was not able to classify with an associated confidence level that exceeds a threshold confidence level, wherein the confidence level indicates accuracy of classification;

update the classification model over a period of time to generate an evolved classification model, wherein the evolved classification model is trained using training sample developed over time to improve the evolved classification model;

apply the evolved classification model to each of the unclassified files;

identify, based on applying the evolved classification model to each of the unclassified files, a subset of the unclassified files that the evolved classification model was not able to classify with a confidence level that exceeds the threshold confidence level;

identify, based on applying the classification model to each of the stale files, a plurality of classified files;

move a first subset of the plurality of classified files to a content management repository, wherein to move the first subset, the instructions further cause the processing circuitry to identify each of the stale files in the first subset as an official record;

delete a second subset of the plurality of classified files, wherein to delete the second subset, the instructions further cause the processing circuitry to identify each of the stale files in the second subset as not an official record; and delete each of the files in the subset of the unclassified files.

* * * * *